Feb. 24, 1970  R. G. DONNELLY ET AL  3,497,332
BRAZING ALLOY FOR JOINING GRAPHITE TO GRAPHITE
AND TO REFRACTORY METALS
Original Filed Sept. 29, 1966
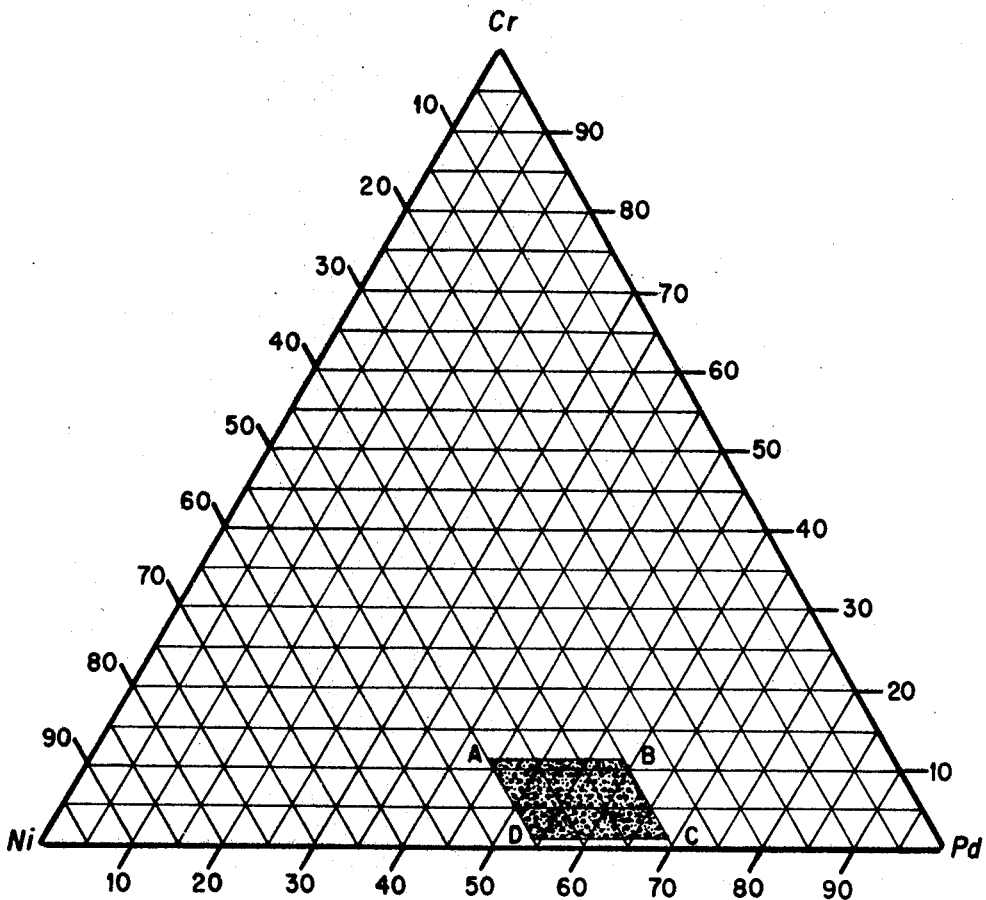
INVENTORS.
Ralph G. Donnelly
Jack M. Jones
BY.
ATTORNEY.

United States Patent Office 3,497,332
Patented Feb. 24, 1970

---

3,497,332
BRAZING ALLOY FOR JOINING GRAPHITE TO GRAPHITE AND TO REFRACTORY METALS
Ralph G. Donnelly and Jack M. Jones, Oak Ridge, Tenn., assignors to the United States of America as represented by the United States Atomic Energy Commission
Continuation of application Ser. No. 583,511, Sept. 29, 1966. This application June 9, 1969, Ser. No. 834,215
Int. Cl. B23k 35/32; B32b 15/00; C22c 5/00
U.S. Cl. 29—195                                     2 Claims

---

ABSTRACT OF THE DISCLOSURE

The joining of graphite to graphite and to refractory metals such as molybdenum, tungsten, and their alloys is effected by employing a brazing alloy consisting essentially of nickel, palladium, and 2 to 12 weight percent chromium.

---

This application is a continuation of copending application Ser. No. 583,511, filed Sept. 29, 1966 now abandoned.

The invention described herein was made in the course of, or under, a contract with the U.S. Atomic Energy Commission. This invention relates generally to a brazing alloy for joining graphite to refractory metals, and more particularly to a nickel-palladium-chromium brazing alloy for joining graphite to graphite and to tungsten, molybdenum, and their alloys.

In the design and development of nuclear reactors it is becoming of increasing importance to utilize materials which will contribute to the over-all efficiency of the reactor. Many of the materials presently being considered have not heretofore been used for structural applications in reactors, particularly where these materials are subjected to high temperatures, irradiation, corrosive environments, etc. Accordingly, if these materials are to be used in the manner envisioned, it becomes necessary to develop mechanisms by which such materials may be joined to one another or to substantially dissimilar materials so as to provide joined structures readily capable of performing their intended function without deleteriously or otherwise affecting the reactor operation.

In certain molten salt reactor applications it is desirable to join graphite to itself and to structural metals. The formation of the joint by a brazing operation is believed to be the most desirable, but several difficulties arise when attempting to effect a satisfactory joint. Graphite has a thermal expansion coefficient different from many metals useable in the high temperature and corrosive environments of a molten salt reactor so as to render it quite difficult to maintain a sound brazed joint when the joints are thermally cycled. The metals molybdenum and tungsten as well as alloys of these metals have been found to function satisfactorily in such reactor environments and have thermal expansion coefficients near that of graphite. However, when previously known brazing alloys having the capability of wetting graphite as well as reasonably low melting points were used to join graphite to these metals and alloys, the differences in the thermal expansion coefficients were still sufficient to cause failure of the joints when the latter were subjected to thermal cycling. Further, most of these previous brazing alloys were found not to be compatible with molten salts. Another shortcoming of the previously known brazing alloys is due to their incapability of withstanding irradiation such as present in the high neutronflux areas of the reactor, or their deleterious effects upon reactor operation from a neutron absorption standpoint. For example, brazing alloys which contain gold have been found to have satisfactory graphite wetting properties, but the use of such alloys in high thermal-neutron flux areas such as in the vicinity of the reactor core is limited by gold transmutation due to its relatively high neutron capture cross section.

It is the aim of the present invention to obviate or substantially minimize the above and other shortcomings by providing a brazing alloy particularly useful for joining graphite to graphite and to molybdenum, tungsten, and alloys thereof so as to provide a joint having properties including a satisfactory compatibility with molten fluoride salts, sufficient strength to withstand thermal cycling, and a relatively low thermal-neutron cross section.

An object of the present invention is to provide a brazing alloy for joining graphite to graphite and to the refractory metals molybdenum and tungsten, other refractory metals, and alloys of such metals.

Another object of the present invention is to provide a brazing alloy for joining graphite to graphite and to said refractory metals and alloys that is characterized by its compatibility with molten or fused fluoride salts, its favorable melting point and thermal-neutron cross section, and its ability to readily wet graphite.

Other and further objects of the invention will be obvious upon an understanding of the illustrative embodiment about to be described, or will be indicated in the appended claims, and various advantages not referred to herein will occur to one skilled in the art upon employment of the invention in practice.

In the accompanying drawing:

The figure is a ternary diagram of the nickel-palladium-chromium system with the brazing alloy compositions of the present invention being depicted graphically as the area bounded by ABCD.

In accordance with this invention graphite is joined to graphite or to the refractory metals molybdenum and tungsten and alloys containing such metals by brazing with an alloy having a composition selected from the nickel-palladium-chromium system. These brazing alloys are particularly advantageous for joining graphite and such metals and alloys where the joined structures are to be utilized in environments such as those found in the core region of molten salt reactors where the joined structures are exposed to corrosive substances, e.g., fused fluoride salts; thermal cycling; and high thermal-neutron flux levels. Some of the features of this brazing alloy include the use of noble metals for providing resistance to corrosion by fused fluoride salts; palladium in place of gold because it has a substantially lower thermal-neutron cross section than gold and is, therefore, not subjected to deleterious transmutation; chromium due to its compatibility with the metals and alloys to which the graphite is joined and its property as a carbide former for facilitating the wetting of the graphite; and its favorable brazing temperatures, particularly when using alloy compositions at or near the minimum-melting-point composition.

The brazing alloys within the scope of this invention are preferably limited to the minimum- or near-minimum-melting point alloy compositions found in the area bounded by ABCD in the accompanying figure. The preferred nickel-palladium-chromium brazing alloys have compositions ranging from 30 to 45 weight percent nickel, 43 to 68 weight percent palladium, and 2 to 12 weight percent chromium. This alloy system allows the selection of brazing temperatures in the range of about 1250° C. to about 1300° C.

While the proportions of nickel or palladium in the brazing alloy system may be varied from the above preferred range, the proportion of chromium may vary from only 2 to 12 weight percent. Variations in the nickel or palladium content will result in higher brazing temperatures. However, if the chromium is below 2 weight percent, the alloy is unsuitable because there is insufficient wetting of the graphite to establish a satisfactory joint and, if the proportion of chromium is above 12 weight percent, a joint embrittling sigma phase intermetallic is formed.

Brazing with these alloys may be effected by practicing conventional brazing techniques. The materials to be joined are positioned in an abutting overlapping relationship, with the brazing alloy at the interface of the abutting materials. The brazing alloy may be in the form of powder, foil, or any other desired configuration. The assemblly is then heated to the brazing temperature under non-oxidizing conditions. An atmosphere of an inert gas or a vacuum is preferably employed. Complete flow of the brazing alloy at the joint surface along with the formation of sufficient graphite-wetting chromium carbide is normally obtained by holding the brazing temperature for a period of about 10 minutes. Thicker or larger graphite and metal structures may require a longer heating period. The resulting joined assembly is then cooled in the absence of oxygen.

The present invention is further illustrated by the following specific example.

EXAMPLE

A series of brazing tests were conducted using alloys in the system described above. In each test a thin foil of the subject brazing alloy was placed between overlapping surfaces of graphite and molybdenum specimens. Brazed joints were made on several graphite-molybdenum assemblies by using the following brazing alloy compositions: 35 weight percent nickel, 60 weight percent palladium, and 5 weight percent chromium; 40 weight percent nickel, 55 weight percent palladium, and 5 weight percent chromium; 35 weight percent nickel, 55 weight percent palladium, and 10 weight percent chromium; and 40 weight percent nickel, 50 weight percent palladium, and 10 weight percent chromium. The joints between the graphite and molybdenum specimens were effected by heating in a vacuum furnace to a temperature of 1250° C. and maintaining this temperature for a 10-minute duration. After cooling, the brazed joints were subjected to 700° C. corrosion tests in molten fluoride salt systems selected from $LiF-BeF-ZrF_4-ThF_4-UF_4$ for a duration of about 1000 hours. Chemical analysis of these joints showed essentially no evidence of corrosion in that only a very slight surface roughening (less than 0.5 mil) of the brazing alloy occurred. Brazed joints were also subjected to thermal cycling tests between 0° C. and 700° C. for 10 cycles and showed no evidence of failure. These thermal cycling tests are similar to thermal cycling conditions expected in typical molten salt reactor operations.

While the above example is directed to the brazing of graphite to molybdenum, it will appear clear that essentially similar results would be expected with tungsten in place of the molybdenum since these two metals have substantially similar expansion coefficients and are brazeable by similar brazing alloys. Further, graphite and alloys of molybdenum and tungsten as well as other refractory metals, e.g., tantalum, niobium, etc., would also enjoy essentially similar results when brazed to graphite by using the brazing alloy of the present invention.

The above example is merely illustrative and is not to be understood as limiting the scope of this invention, which is limited only as indicated in the appended claims.

What is claimed is:

1. A composite structure comprising a structural portion of graphite joined by a fused brazing alloy to another structural portion consisting of one of the materials selected from graphite and the group of refractory metals consisting of molybdenum, tungsten, and alloys thereof, said fused brazing alloy having a brazing alloy composition, prior to brazing, consisting of about 30 to 45 weight percent nickel, about 43 to 68 weight percent palladium, and 2 to 12 weight percent chromium.

2. A composite structure for use in a relatively high thermal-neutron flux area of a nuclear reactor fueled by molten fluoride salts and comprising a structural portion of graphite joined by a fused brazing alloy to another structural portion consisting of one of the materials selected from graphite and the group of refractory metals consisting of molybdenum, tungsten, and alloys thereof, said fused brazing alloy having a brazing alloy composition, prior to brazing, consisting of about 30 to 45 weight percent nickel, about 43 to 68 weight percent palladium, and 2 to 12 weight percent chromium, the joint provided by the fused brazing alloy being characterized by its compatibility with molten fluoride salts, its lower thermal-neutron cross section for inhibiting transmutation of the brazing alloy constituents, and its ability of withstanding repetitive thermal cyclings in a temperature range of 0° C. to 700° C.

References Cited

UNITED STATES PATENTS

| | | | |
|---|---|---|---|
| 2,431,975 | 12/1947 | Yockey et al. | 29—195 X |
| 3,053,652 | 9/1962 | Mobley et al. | 75—134 X |
| 3,276,113 | 10/1966 | Metcalf | 29—195 X |
| 3,442,006 | 5/1969 | Guichet et al. | 29—195 X |

L. DEWAYNE RUTLEDGE, Primary Examiner

G. K. WHITE, Assistant Examiner

U.S. Cl. X.R.

75—134, 172; 161—188, 213